(12) United States Patent
Ojo et al.

(10) Patent No.: US 6,950,143 B2
(45) Date of Patent: Sep. 27, 2005

(54) MOTION COMPENSATED DE-INTERLACING IN VIDEO SIGNAL PROCESSING

(75) Inventors: Olukayode Anthony Ojo, Eindhoven (NL); Jeroen Maria Kettenis, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 262 days.

(21) Appl. No.: 10/011,615

(22) Filed: Dec. 6, 2001

(65) Prior Publication Data

US 2002/0085114 A1 Jul. 4, 2002

(30) Foreign Application Priority Data

Dec. 11, 2000 (EP) .............................. 00204434

(51) Int. Cl.⁷ .................................................. H04N 7/01
(52) U.S. Cl. ........................................ 348/452; 348/714
(58) Field of Search ............................... 348/452, 607, 348/700, 448, 458, 714

(56) References Cited

U.S. PATENT DOCUMENTS

| 4,743,970 | A | * | 5/1988 | Barnett et al. ............... 348/717 |
| 4,987,489 | A | | 1/1991 | Hurley et al. ................ 358/105 |
| 5,134,480 | A | | 7/1992 | Wang et al. .................. 358/140 |
| 5,257,103 | A | * | 10/1993 | Vogeley et al. .............. 348/450 |
| 5,532,750 | A | | 7/1996 | De Haan et al. ............. 348/452 |
| 5,592,231 | A | | 1/1997 | Clatanoff et al. ............ 348/452 |
| 5,657,401 | A | | 8/1997 | De Haan et al. ............. 382/275 |
| 5,689,305 | A | | 11/1997 | Ng et al. ..................... 348/416 |
| 6,330,032 | B1 | * | 12/2001 | Boehlke ....................... 348/452 |
| 6,392,712 | B1 | * | 5/2002 | Gryskiewicz et al. ........ 348/584 |
| 6,411,341 | B1 | * | 6/2002 | De Haan et al. ............. 348/714 |
| 6,445,741 | B1 | * | 9/2002 | Bellers et al. ........... 375/240.16 |
| 6,556,193 | B1 | * | 4/2003 | Auld et al. .................. 345/418 |

FOREIGN PATENT DOCUMENTS

EP 0710018 A2 5/1996 ............ H04N/5/44

* cited by examiner

Primary Examiner—Victor R. Kostak
(74) Attorney, Agent, or Firm—Edward W. Goodman

(57) ABSTRACT

A processing circuit for motion compensated de-interlacing of video signals, having a line memory 21, a de-interlacing circuit 22, a frame memory 24, and a cache memory 25, further includes a pixel mixer 29 interposed between the cache memory 25 and the de-interlacing circuit 22.

10 Claims, 1 Drawing Sheet

MOTION COMPENSATED DE-INTERLACING IN VIDEO SIGNAL PROCESSING

BACKGROUND OF THE INVENTION

1. Field of the Invention

The present invention relates to motion compensated de-interlacing in video signal processing, particularly recursive de-interlacing

2. Description of the Related Art

De-interlacing is performed when it is required to convert a video signal from an interlaced signal to a sequential or progressively scanned image signal. Additional lines need to be generated to insert between the signal lines of a field already supplied. This can be done by creating pixel values corresponding to the arithmetical mean, or the median, of positionally corresponding pixel values of two neighboring existing lines of the same field, or the interlaced line of the previous field may be taken into account. An improved image is obtained if a motion compensation interpolation is used. This compares lines in two adjacent fields to determine whether segments of missing lines are moving or not. If the segment is moving, a motion vector is generated and the segment is handled differently. Inaccuracies in the motion vector estimates lead to aliases and visible distortions.

A processing circuit is known in U.S. Pat. No. 5,532,750 for motion compensated de-interlacing of a radio signal, this processing circuit comprising a line memory, a de-interlacing circuit, a frame memory, and a cache memory to mix current and motion compensated previous data in a controlled manner.

In U.S. Pat. No. 5,657,401 a noise measurement circuit for video apparatus, using a plurality of noise estimates, is described.

However, this known processing circuit is affected by random or arbitrary motion vectors. Such vectors are particularly common in noisy images or those containing large homogeneous parts, and these vectors tend to cause or exaggerate fragmentation of objects, correlation of noise and undesirable error propagation. To counter these disadvantages, the level of de-interlacing is often reduced in practice, and thus, the vertical alias reduction is not as good as it should be.

SUMMARY OF THE INVENTION

It is, inter alia, an object of the invention to provide an improved de-interlacing. To this end, the invention provides a de-interlacing device and a display apparatus comprising such a de-interlacing device.

According to the present invention, there is provided a processing circuit for motion compensated de-interlacing. comprising a line memory, a de-interlacing circuit, a frame memory, and a cache memory, characterized in that the processing circuit further comprises a pixel mixer interposed between the cache memory and the de-interlacing circuit.

According to the preferred embodiment, the pixel mixer is arranged to compute the difference between motion compensated and non-motion compensated samples of pixel data. The circuit then uses this difference to control the weighted averaging of subsequent equivalent pixels before de-interlacing is effected. The underlying principle is that if motion compensation is to be safe for de-interlacing, there must be a significant difference between a motion-compensated pixel within a previous frame using the motion vector, and the pixel in the same position without motion compensation. If the difference is negligible, then the motion vector is judged to be due to noise or because the region in the previous frame is homogenous. Effectively, the difference information is used to "fade" between a motion compensated pixel and its uncompensated counterpart such that the artifacts affecting image quality are reduced.

The processing circuit uses the motion compensated previous pixels in a controlled manner. A weighted part of the previous motion compensated pixels is mixed with another weighted part of the previous pixels at the same reference position, but without motion compensation. The sum of the weights is always equal to unity, and the contribution of each pixel is determined by an estimated motion vector reliability. This mixing is such that when the motion vectors are reliable, the weight of the motion, compensated previous pixels approaches unity, while, when the motion vectors are unreliable, the weight tends to zero.

Preferably the circuit of the invention further comprises a de-interlacing filter which has means for generating an initial de-interlaced pixel, and may optionally comprise two first-order filters for the temporal filtering of the original input pixel data and the initial de-interlaced pixel data. It may also comprise means for calculating the filter coefficients for both the original and the de-interlaced pixels.

The circuit of the invention is applicable to any motion compensated de-interlacing algorithm and serves to reduce motion error propagation, enhance stationary edges, reduce detail flicker and prevent spurious errors on stationary images.

BRIEF DESCRIPTION OF THE DRAWING

For a better understanding of the present invention, and to show how the same may be carried into effect, reference will now be made to the accompanying drawings, in which.

DESCRIPTION OF THE PREFERRED EMBODIMENTS

Figure 1:
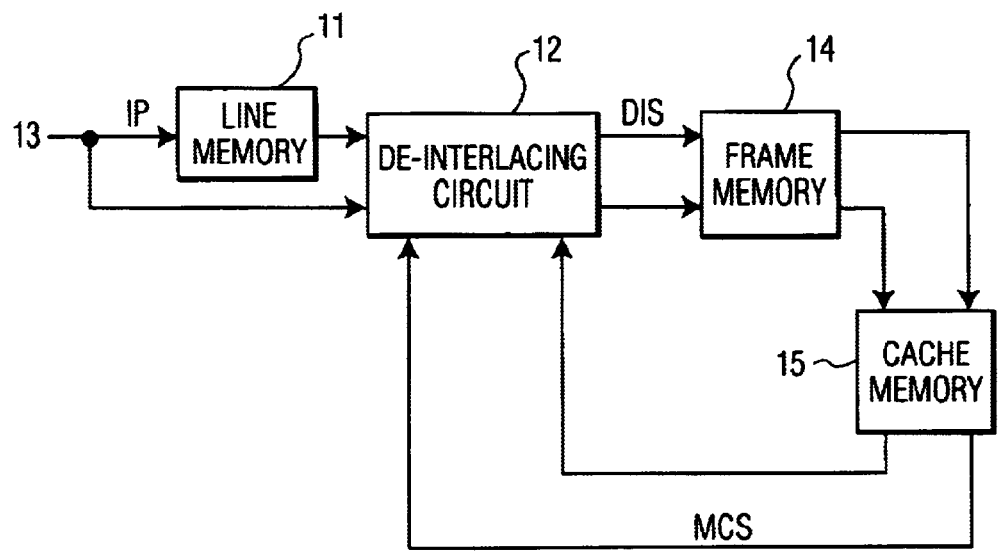
FIG. 1 is a schematic diagram of a circuit according to the prior art for motion-compensated de-interlacing.

FIG. 1 schematically illustrates a motion compensated de-interlacing circuit typical of the prior art. It comprises a line memory 11 connected to receive and input signal IP at input 13, a de-interlacing circuit 12 also connected to receive the input signal IP at input 13, and connected to an output of the line memory 11. A frame memory 14 is connected to receive a de-interlaced output signal DIS from the de-interlacing circuit 12 and to feed its output (which is equivalent to the previous input) to a cache memory 15. The cache memory 15 effects the motion compensation and its output signal MCS is supplied to the de-interlacing circuit 12.

Figure 2:
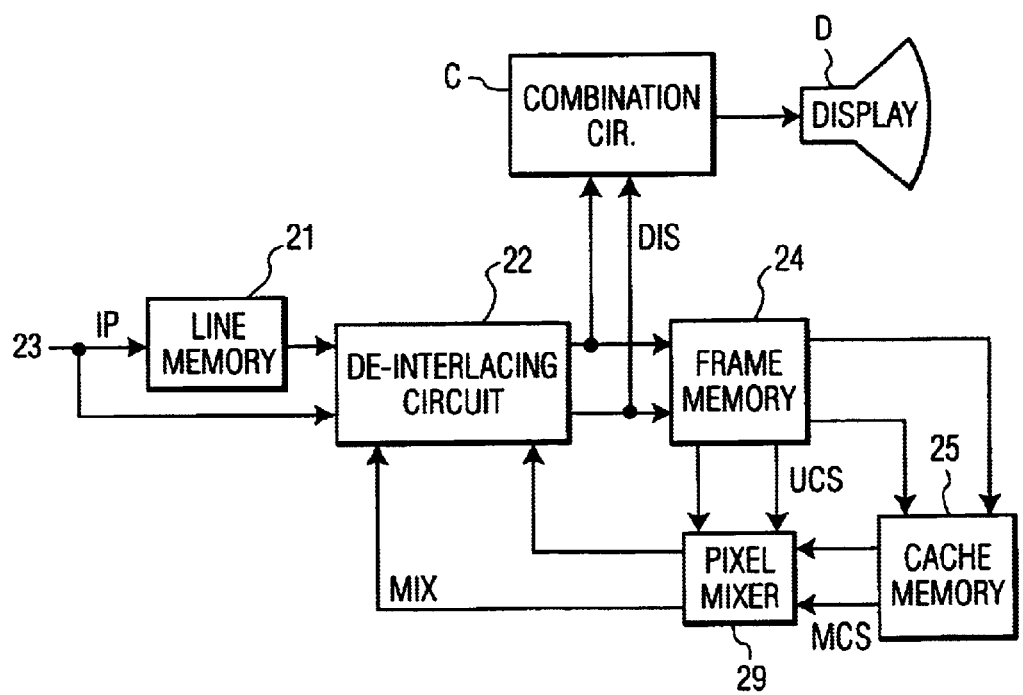
FIG. 2 is a schematic diagram of a display apparatus comprising an embodiment of a circuit according to the present invention for motion-compensated de-interlacing.

In FIG. 2, a circuit according to the present invention is illustrated. Again, a line memory 21 receives, at its input 23, the input signal IP. The output of the line memory 21 is supplied to a de-interlacing circuit 22, which supplies its output to a frame memory 24, an output of which (effectively the previous input) is fed to the cache memory 25 for generating a motion compensated signal MCS as in the prior art circuit of FIG. 1.

The remainder of the circuit in FIG. 2 is different to that in FIG. 1. A pixel mixer 29 is interposed between the cache memory 25 and the de-interlacing circuit 22. The pixel mixer 29 receives the motion compensated signal MCS from the cache memory 25, and also the uncompensated signal UCS from the frame memory 24. The pixel mixer 29 then generates a mixer signal MIX which is supplied to the de-interlacing circuit 22. The pixel mixer circuit 29 determines the difference between motion compensated and non-motion compensated samples of the video signal and uses the difference to control the weighted averaging of the pixels before de-interlacing. Effectively, in this invention, motion compensation depends upon a significant difference between a motion compensated pixel within a previous frame using the motion vector, and the pixel in the same position without motion compensation. This is because a negligible difference indicates that the motion vector is due to noise or a homogenous region of the previous frame. The de-interlacing circuit 22 generates an initial de-interlaced pixel. Also, it preferably contains two first-order filters for the temporal filtering of the original input pixel and the initial de-interlaced pixel. Moreover, it calculates the filter coefficients for both the original and the de-interlaced pixels.

A combination circuit C inserts the output lines from the de-interlacing circuit between each other, and applies the result to a display D.

In a preferred embodiment, the invention provides a motion-compensated de-interlacing circuit in which the motion-compensated previous pixels are used in a controlled manner. A weighted part of the previous motion-compensated pixels is mixed with another weighted part of the previous pixels at the same reference position, but without motion-compensation. The sum of these weights is always equal to unity, and the contribution of each pixel is determined by an estimated motion vector reliability figure. The mixing is such, that when the motion vectors are reliable, the weight of the motion-compensated previous pixels approaches unity, whereas when the motion vectors are unreliable, the weight tends to zero.

Preferably, the reliability criterion employs the absolute difference between the motion-compensated and uncompensated pixels, the differences being either scaled and clipped appropriately, or translated into weighting coefficients thru a look-up table function. The reliability criterion preferably employs a motion vector smoothness criterion, whereby a motion vectors is compared with its spatial neighbors, and the spatial correlation, which is a figure between 0 and 1, is used as the weighting coefficient for the motion-compensated pixels. A value of 1 minus that weighting coefficient is used for the non-compensated counterparts. Preferably, the reliability criterion uses the spatial correlation of the pixels in the input signal, such that the weight of the motion-compensated pixels is reduced as the detail in the picture decreases. Preferably, the preference and control of the reliability criterion can be supplied as external input. Alternatively, it can be fixed in the implementation.

Preferably, an image noise estimator, such as the one described in U.S. Pat. No. 5,657,401, is combined with the pixel mixer circuit, such that the weighting coefficients of the pixels is varied with varying image noise.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A processing circuit for motion compensated de-interlacing of video signals, the processing circuit comprising:

an input for receiving video signal;

a line memory coupled to said input;

a de-interlacing circuit coupled to said input and to an output of said line memory;

a frame memory coupled to an output of said de-interlacing circuit for receiving for receiving a de-interlaced signal;

a cache memory coupled to an output of said frame memory; and a pixel mixer coupled to an output of the cache memory, an output of the pixel mixer being coupled to the de-interlacing circuit.

2. The processing circuit as claimed in claim 1, wherein the pixel mixer receives data corresponding to a pixel with motion compensation and data corresponding to said pixel without motion compensation, said pixel mixer applying a first weighting factor to the motion compensated pixel data and a second weighting factor to said pixel data without motion compensation.

3. The processing circuit as claimed in claim 1, wherein said processing circuit further comprises:

means for determining an estimated motion vector reliability.

4. The processing circuit as claimed in claim 2, wherein said processing circuit further comprises:

means for determining an estimated motion vector reliability, wherein the weighting factors are determined as a function of the estimated motion reliability.

5. The processing circuit as claimed in claim 1, wherein the pixel mixer generates a signal corresponding to an absolute difference between the motion compensated pixel data and the non-motion compensated pixel data.

6. The processing circuit as claimed in claim 5, wherein said processing circuit further comprises:

means for scaling or clipping the absolute difference signal.

7. The processing circuit as claimed in claim 1, wherein said processing circuit further comprises:

means for generating a motion vector smoothness criterion including means for comparing a motion vector with spatial neighbors of said motion vector, and means for generating the weighting factors as a function of the spatial correlation as a figure between 0 and 1.

8. The processing circuit as claimed in claim 2, wherein the first weighting factor is reduced in dependence upon the level of detail in the image to which the video signal relates.

9. The processing circuit as claimed in claim 2, wherein said processing circuit further comprises:

an image noise estimator, and wherein the weighting factors are dependent upon the image noise estimated by the image noise estimator.

10. A display apparatus, comprising:

a processing circuit as claimed in claim 1; and a display for displaying an output signal of the processing circuit.

* * * * *